United States Patent
Matsubara

[11] 3,958,866
[45] May 25, 1976

[54] COPYING OBJECTIVE LENS SYSTEM

[75] Inventor: Masaki Matsubara, Hachiouji, Japan

[73] Assignee: Olympus Optical Co., Ltd., Tokyo, Japan

[22] Filed: Oct. 25, 1974

[21] Appl. No.: 518,196

[30] Foreign Application Priority Data
Oct. 27, 1973 Japan.............................. 48-120388

[52] U.S. Cl. .................................................. 350/214
[51] Int. Cl.² ........................ G02B 9/64; G02B 9/60
[58] Field of Search ............ 350/214, 216, 220, 206

[56] References Cited
UNITED STATES PATENTS

| | | | |
|---|---|---|---|
| 2,830,495 | 4/1958 | Koch et al. .................... | 350/214 X |
| 3,133,983 | 5/1964 | Rickless et al. ................ | 350/216 X |
| 3,221,601 | 12/1965 | Betensky et al. .............. | 350/220 X |

*Primary Examiner*—Paul A. Sacher
*Attorney, Agent, or Firm*—Cushman, Darby & Cushman

[57] ABSTRACT

A large-aperture, compact, light-weight copying objective lens system comprising seven lenses arranged symmetrically on both sides of a stop positioned at the center of said lens system and satisfying the following conditions:

(1) $n_1 > 1.7, \nu_1 > 40$ (2) $0.2f < |f_2| < 0.6f, f_2 < 0$ (3) $f < f_4 < 10f$

8 Claims, 10 Drawing Figures

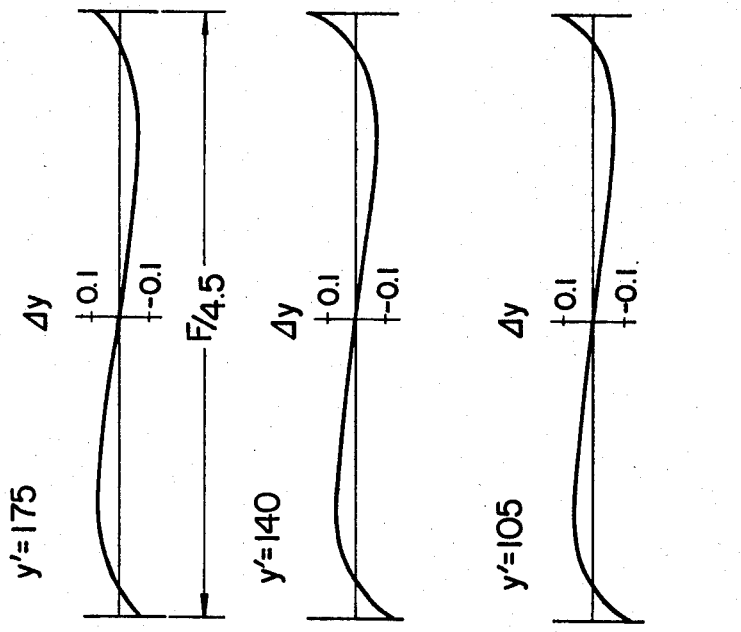
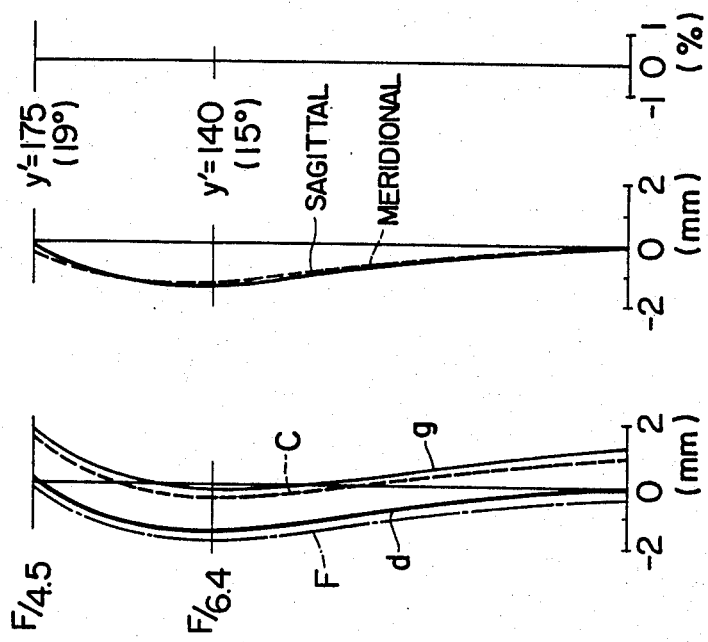
FIG. 3A  FIG. 3B  FIG. 3C  FIG. 3D

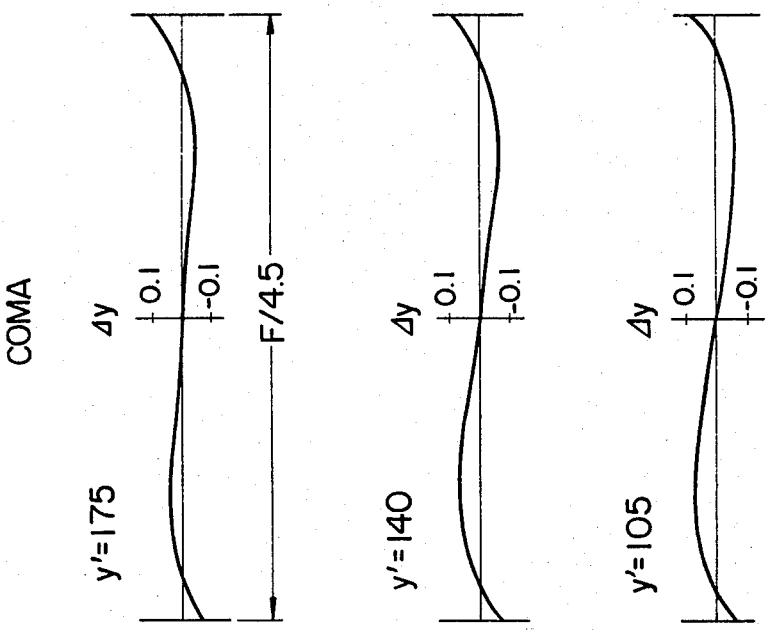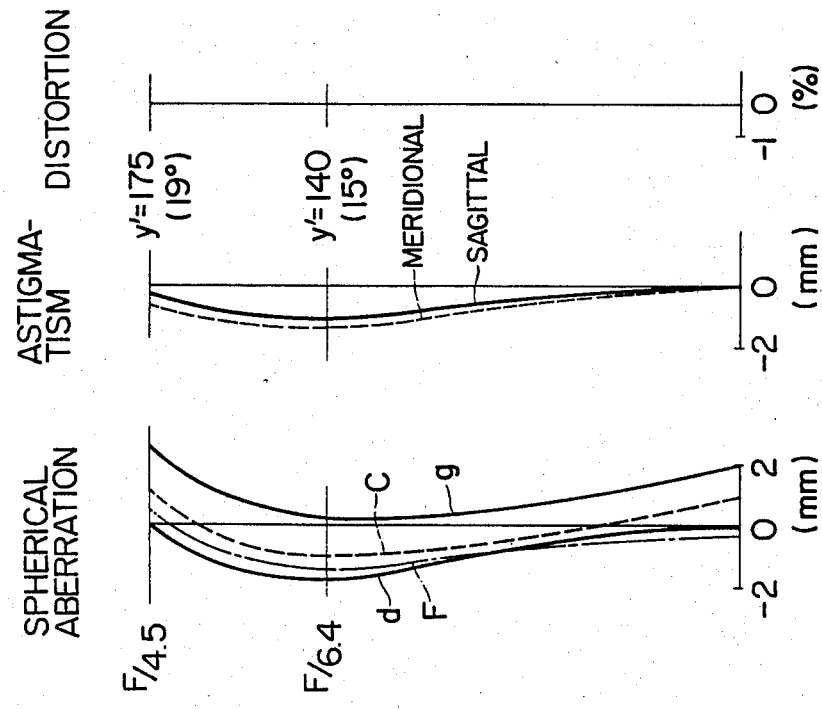

COPYING OBJECTIVE LENS SYSTEM

BACKGROUND OF THE INVENTION a. Field of the Invention

The present invention relates to a copying objective lens system and, more particularly, to a copying objective lens system having an aperture ratio of F/4.5, field angle of 19° which can be used for wave lengths from 436 mμ (g) through 656 mμ (c) and for magnification about x 1 and for which aberrations are corrected favourably.

b. Description of the Prior Art

As known lens systems of this kind have small aperture ratio, appearance of a copying objective lens system having a large aperture ratio is earnestly expected. Besides, because of the nature of copying devices, it is necessary to move the lens system. Therefore, the lens system should be small and light-weighted.

SUMMARY OF THE INVENTION

It is, therefore, a primary object of the present invention to provide a compact copying objective lens system having a large aperture ratio.

The copying objective lens system according to the present invention is arranged perfectly symmetrically in respect to a stop positioned at the center. Therefore, when respective lenses constituting said lens system are called first lenses $L_1$, second lenses $L_2$, third lenses $L_3$ and fourth len $L_4$ in the order from both of the objective side and image side toward the center, each first lens $L_1$ is a positive meniscus lens, each second lens $L_2$ is a negative meniscus lens, each third lens $L_3$ is a positive meniscus lens, a fourth lens is a biconvex lens for which both surfaces have an equal radius of curvature, and a stop is arranged at the center of said fourth lens. All surfaces of said lenses are arranged to be concave toward the stop. Besides, when reference symbols $n_1$ and $\nu_1$ respectively represents the refractive index and Abbe's number of said first lens $L_1$, reference symbol $f_2$ represents the focal length of said second lens $L_2$, reference symbol $f_4$ represents the focal length of said fourth lens and reference symbol $f$ represents the focal length of the lens system as a whole, the copying objective lens system according to the present invention satisfies the following conditions:

(1) $n_1 > 1.7, \nu_1 > 40$ (2) $0.2f < |f_2| < 0.6f, f_2 < 0$ (3) $f < f_4 < 10f$

In said lens system, the first lens $L_1$ and second lens $L_2$ may be arranged either as single lenses respectively or as a cemented doublet lens by cementing said two lenses together.

Meaning of respective conditions for the above-mentioned lens system according to the present invention is as described below. The condition (1) is established for correction of spherical aberration and chromatic aberration. Generally, symmetrically arranged lens systems have a tendency that said aberrations caused in the front lens group are not cancelled by the rear lens group but are still added and increased. Therefore, for such symmetrically arranged lens systems, it is necessary to limit aberrations caused in each of the front and rear lens groups of the system to satisfactorily small values. It is known that spherical aberration is generally corrected by making the refractive index large. In the present invention, spherical aberration which is caused by making the aperture ratio large is corrected by utilizing the above-mentioned idea. That is, by using a material having a refractive index exceeding 1.7 for the first lens $L_1$, spherical aberration is limited to a value harmless for practical use. If a material for which the refractive index is 1.7 or less is used for the first lens $L_1$, considerable spherical aberration is caused and it becomes difficult to correct it by the other lenses. Generally, chromatic aberration is eliminated by using materials of different dispersions for lenses so that dispersions of respective lenses will be well balanced. Because of the above-mentioned characteristic of symmetrically arranged lens systems, it is essential to design the lens system so that chromatic aberration caused by the front lens becomes as small as possible. Therefore, in the present invention, a material having dispersion exceeding 40 is used for the front lens in order to limit chromatic aberration as small as possible by the front lens group and to correct it to attain favourable balance by the rear lens group. If dispersion of the front lens is 40 or less, it becomes very difficult to select suitable materials for the other lenses and, consequently, favourable correction of chromatic aberration becomes impossible.

The condition (2) is for correction of curvature of the field. That is, Petzval's sum is made small by using a negative lens having strong refractive power as the second lens $L_2$. If $|f_2|$ of the condition (2) exceeds the upper limit, negative refractive power becomes weak. Consequently, Petzval's sum becomes large, the above-mentioned object cannot be attained, and the field cannot be made flat. If $|f_2|$ becomes smaller than the lower limit, negative power becomes strong and, therefore, Petzval's sum becomes small. However, spherical aberration occurs and it becomes impossible to correct it.

The condition (3) is for correction of astigmatism. Generally, at the position of the fourth lens $L_4$, a glass plate with parallel flat surfaces which has almost no refractive power is used in order to reduce the height of ray and to correct off-axial astigmatism without aggravating paraxial aberration. In the present invention, the above idea is also utilized. That is, the fourth lens $L_4$ is arranged to have weak positive refractive power in order to as far as possible reduce the heights of rays at positions of large field angles so that said rays will not pass through marginal portions. Thus, astigmatism is prevented. If $f_4$ exceeds the upper limit of the condition (3), the above-mentioned correcting effect becomes small and it becomes impossible to correct astigmatism. If $f_4$ is smaller than the lower limit, the above-mentioned correcting effect becomes too large. As a result, paraxial aberration and other aberrations are caused and it becomes impossible to correct them favourably.

As described in the above, for the copying objective lens system according to the present invention which satisfies the above-mentioned conditions, aberrations are corrected quite favourably. Besides, by establishing the following condition for the airspace $d_4$ between the second lens $L_2$ and third lens $L_3$ and the airspace $d_6$ between the third lens $L_3$ and fourth lens $L_4$, it is possible to correct astigmatism more favourably and to make the lens system as a whole more compact.

(4) $0.04f < d_4 + d_6 < 0.06f$

If $d_4 + d_6$ exceeds the upper limit of the condition (4), rays will pass at high positions distant from the optical axis. As a result, considerable astigmatism is caused in negative direction and it will become difficult to correct it by other parts. Besides, when airspaces are large, the lens system as a whole becomes large and the object to provide a compact lens system cannot be attained. If $d_4 + d_6$ is smaller than the lower limit, it is desirable for making the lens system compact. However, it will become difficult to favourably correct astigmatism caused in positive direction.

BRIEF EXPLANATION OF THE DRAWINGS

FIGS. 3A, 3B, 3C, 3D, 4A, 4B, 4C and 4D respectively show graphs illustrating aberration curves of respective embodiments of the lens system according to the present invention.

DETAILED DESCRIPTION OF THE PREFERRED EMBODIMENTS

Figure 1:
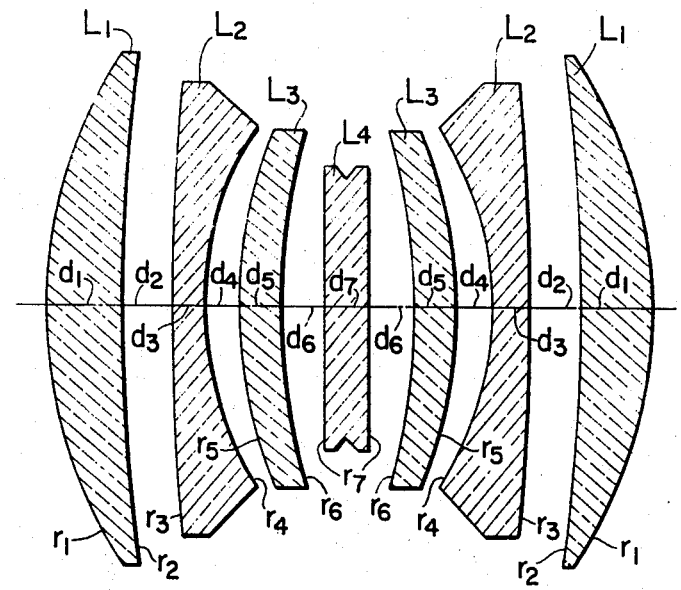
FIGS. 1 and 2 respectively show sectional views of respective embodiments of the copying objective lens system according to the present invention.

Preferred embodiments of the copying objective lens system according to the present invention are as shown below.

Embodiment 1

$f = 100$    $2\omega = 38°$    F/4.5
$r_1 = 30.077$
  $d_1 = 5.16$    $n_1 = 1.7859$    $\nu_1 = 44.2$
$r_2 = 146.415$
  $d_2 = 3.55$
$r_3 = 165.149$
  $d_3 = 2.30$    $n_2 = 1.6727$    $\nu_2 = 32.1$
$r_4 = 21.543$
  $d_4 = 2.42$
$r_5 = 32.091$
  $d_5 = 2.86$    $n_3 = 1.72$    $\nu_3 = 42.1$
$r_6 = 47.368$
  $d_6 = 2.91$
$r_7 = 407.040$
  $d_7 = 3.06$    $n_4 = 1.5317$    $\nu_4 = 48.9$
$r_7 = -407.04$
  $d_6 = 2.91$
$r_6 = -47.368$
  $d_5 = 2.86$    $n_3 = 1.72$    $\nu_3 = 42.1$
$r_5 = -32.091$
  $d_4 = 2.42$
$r_4 = -21.543$
  $d_3 = 2.30$    $n_2 = 1.6727$    $\nu_2 = 32.1$
$r_3 = -165.149$
  $d_2 = 3.55$
$r_2 = -146.415$
  $d_1 = 5.16$    $n_1 = 1.7859$    $\nu_1 = 44.2$
$r_1 = -30.077$
  $f_2 = -37.1$      $f_4 = 383.2$ Embodiment 2

$f = 100$    $2\omega = 38°$    F/4.5
$r_1 = 30.062$
  $d_1 = 7.17$    $n_1 = 1.816$    $\nu_1 = 46.84$
$r_{2,3} = 61.620$
  $d_{2,3} = 4.1$    $n_2 = 1.6727$    $\nu_2 = 32.1$
$r_4 = 21.731$
  $d_4 = 2.22$
$r_5 = 32.979$
  $d_5 = 2.91$    $n_3 = 1.7432$    $\nu_3 = 49.37$
$r_6 = 48.451$
  $d_6 = 3.0$
$r_7 = 659.947$
  $d_7 = 3.12$    $n_4 = 1.5311$    $\nu_4 = 62.44$
$r_7 = -659.947$
  $d_6 = 3.0$
$r_6 = -48.451$
  $d_5 = 2.91$    $n_3 = 1.7432$    $\nu_3 = 49.37$
$r_5 = -32.979$
  $d_4 = 2.22$
$r_4 = -21.731$
  $d_{2,3} = 4.1$    $n_2 = 1.6727$    $\nu_2 = 32.1$
$r_{2,3} = -61.620$
  $d_1 = 7.17$    $n_1 = 1.816$    $\nu_1 = 46.84$
$r_1 = -30.062$
  $f_2 = -52.0$      $f_4 = 621.6$ Embodiment 3

$f = 100$    $2\omega = 38°$    F/4.5
$r_1 = 28.731$
  $d_1 = 5.371$    $n_1 = 1.7859$    $\nu_1 = 44.1$
$r_2 = 303.406$
  $d_2 = 2.304$
$r_3 = 169.579$
  $d_3 = 1.550$    $n_2 = 1.6727$    $\nu_2 = 32.1$
$r_4 = 21.949$
  $d_4 = 2.522$
$r_5 = 34.536$
  $d_5 = 2.974$    $n_3 = 1.72$    $\nu_3 = 42.08$
$r_6 = 48.758$
  $d_6 = 3.029$
$r_7 = 290.474$
  $d_7 = 1.592$    $n_4 = 1.53172$    $\nu_4 = 48.9$
$r_7 = -290.474$
  $d_6 = 3.029$
$r_6 = -48.758$
  $d_5 = 2.974$    $n_3 = 1.72$    $\nu_3 = 42.08$
$r_5 = -34.536$
  $d_4 = 2.522$
$r_4 = -21.949$
  $d_3 = 1.550$    $n_2 = 1.6727$    $\nu_2 = 32.1$
$r_3 = -169.579$
  $d_2 = 2.304$
$r_2 = -303.406$
  $d_1 = 5.371$    $n_1 = 1.7859$    $\nu_1 = 44.1$
$r_1 = -28.731$
  $f_2 = -37.6$      $f_4 = 273$ Embodiment 4

$f = 242.513$    $2\omega = 38°$    F/4.5
$r_1 = 25.847$
  $d_1 = 5.286$    $n_1 = 1.7859$    $\nu_1 = 44.1$
$r_2 = 206.592$
  $d_2 = 2.267$
$r_3 = 331.879$
  $d_3 = 1.525$    $n_2 = 1.7495$    $\nu_2 = 35.19$
$r_4 = 20.172$
  $d_4 = 2.482$
$r_5 = 32.882$
  $d_5 = 2.927$    $n_3 = 1.72$    $\nu_3 = 50.25$
$r_6 = 51.535$
  $d_6 = 2.981$
$r_7 = 331.8795$
  $d_7 = 1.566$    $n_4 = 1.53172$    $\nu_4 = 48.9$
$r_7 = -331.8795$
  $d_6 = 2.981$
$r_6 = -51.535$
  $d_5 = 2.927$    $n_3 = 1.72$    $\nu_3 = 50.25$
$r_5 = -32.882$
  $d_4 = 2.482$
$r_4 = -20.172$
  $d_3 = 1.525$    $n_2 = 1.7495$    $\nu_2 = 35.19$
$r_3 = -346.766$
  $d_2 = 2.267$
$r_2 = -206.592$
  $d_1 = 5.286$    $n_1 = 1.7859$    $\nu_1 = 44.1$
$r_1 = -25.847$
  $f_2 = -28.7$      $f_4 = 312.5$ In the above, reference symbols $r_1$ through $r_7$ respectively represent radii of curvature of respective lens surfaces, reference symbols $d_1$ through $d_7$ respectively represent thicknesses of respective lenses and airspaces between respective lenses, $n_1$ through $n_4$ respectively represent refractive indexes of respective lenses, and reference symbols $\nu_1$ through $\nu_4$ respectively represent Abbe's numbers of respective lenses, and reference symbols $f$, $f_2$ and $f_4$ respectively represent focal lengths of the lens system as a whole, second lens $L_2$ and fourth lens $L_4$.

As explained already, the copying objective lens system according to the present invention is arranged symmetrically in respect to the stop positioned at the center. Therefore, as shown in FIG. 1 and FIG. 2, same symbols are given to surfaces of respective lenses, airspaces between lenses, etc. which correspond to each other.

Figure 2:
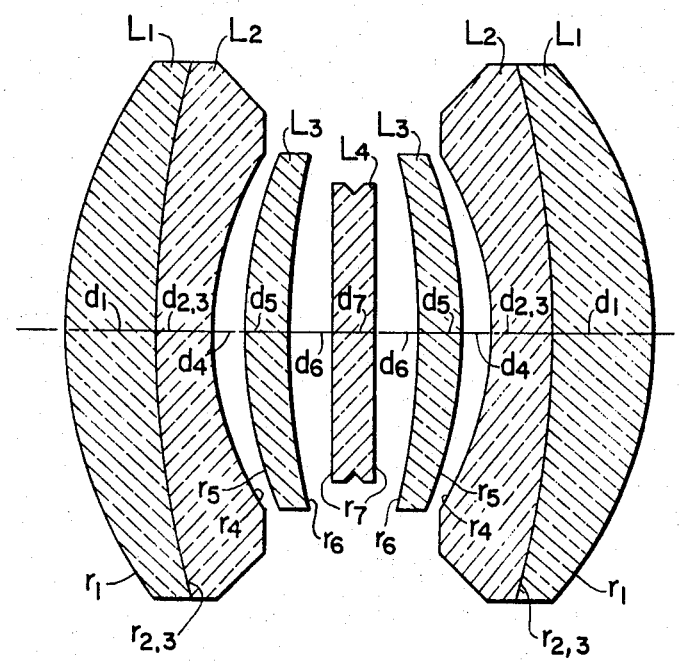

In these embodiments, the first lens $L_1$ and second lens $L_2$ of the embodiments 1, 3 and 4 are arranged as single lenses as shown in FIG. 1. On the other hand, for the embodiment 2, the first lens $L_1$ and second lens $L_2$ are cemented together. It is a matter of course that the value $f_2 = -52.0$ given in said embodiment 2 shows the focal length of the negative meniscus lens in the cemented doublet lens.

Aberration curves of the embodiment 1 are as shown in FIGS. 3A, 3B, 3C and 3D, and aberration curves of the embodiment 2 are as shown in FIGS. 4A, 4B, 4C and 4D.

I claim:

1. A copying objective lens system comprising seven lenses arranged symmetrically on both sides of a stop positioned at the center of said lens system and arranged from both of the object side and image side in the order of first lenses, second lenses, third lenses and a fourth lens, said first lenses being positive meniscus lenses, said fourth lens being a biconvex lens having weak refractive power, and said copying objective lens system satisfying the following conditions:

(1) $[n_1 > 1.7, \nu_1 > 40]\ 1.82 > n_1 > 1.75, 47 > \nu_1 > 40$ (2) $0.2f < |f_2| < 0.6f, f_2 < 0$ (3) $f < f_4 < 10f$ wherein reference symbol $n_1$ represents the refractive index of the first lens, reference symbol $\nu_1$ represents Abbe's number of the first lens, reference symbols $f_2$ and $f_4$ respectively represent focal lengths of the second and fourth lenses, and reference symbol $f$ represents the focal length of the lens system as a whole.

2. A copying objective lens system according to claiam 1 in which said first lenses are respectively cemented to said second lenses to form cemented doublet lenses respectively.

3. A copying objective lens system according to claim 1 in which said lens system further satisfies the following condition (4):

(4) $0.04f < d_4 + d_6 < 0.06f$

4. A copying objective lens system according to claim 1 in which the position of said stop is at the center of said fourth lens.

5. A copying objective lens system comprising seven lenses arranged symmetrically on both sides of a stop positioned at the center of said lens system and arranged from both of the object side and image side in the order of first lenses, second lenses, third lenses and a fourth lens, said first lenses being positive meniscus lenses, said second lenses being negative meniscus lenses, said third lenses being positive meniscus lenses, said fourth lens being a biconvex lens having weak refractive power, and said copying objective lens system having the following numerical values:

| | | |
|---|---|---|
| $f = 100$ | $2\omega = 38°$ | F/4.5 |
| $r_1 = 30.077$ | | |
| $d_1 = 5.16$ | $n_1 = 1.7859$ | $\nu_1 = 44.2$ |
| $r_2 = 146.415$ | | |
| $d_2 = 3.55$ | | |
| $r_3 = 165.149$ | | |
| $d_3 = 2.30$ | $n_2 = 1.6727$ | $\nu_2 = 32.1$ |
| $r_4 = 21.543$ | | |
| $d_4 = 2.42$ | | |
| $r_5 = 32.091$ | | |
| $d_5 = 2.86$ | $n_3 = 1.72$ | $\nu_3 = 42.1$ |
| $r_6 = 47.368$ | | |
| $d_6 = 2.91$ | | |
| $r_7 = 407.040$ | | |
| $d_7 = 3.06$ | $n_4 = 1.5317$ | $\nu_4 = 48.9$ |
| $r_7 = -407.04$ | | |
| $d_6 = 2.91$ | | |
| $r_6 = -47.368$ | | |
| $d_5 = 2.86$ | $n_3 = 1.72$ | $\nu_3 = 42.1$ |
| $r_5 = -32.091$ | | |
| $d_4 = 2.42$ | | |
| $r_4 = -21.543$ | | |
| $d_3 = 2.30$ | $n_2 = 1.6727$ | $\nu_2 = 32.1$ |
| $r_3 = -165.149$ | | |
| $d_2 = 3.55$ | | |
| $r_2 = -146.415$ | | |
| $d_1 = 5.16$ | $n_1 = 1.7859$ | $\nu_1 = 44.2$ |
| $r_1 = -30.077$ | | |
| $f_2 = -37.1$ | | $f_4 = 383.2$ | wherein reference symbols $r_1$ through $r_7$ respectively represent radii of curvature of respective lens surfaces, reference symbols $d_1$ through $d_7$ respectively represent thicknesses of respective lenses and airspaces between respective lenses, $n_1$ through $n_4$ respectively represent refractive indexes of respective lenses, and reference symbols $\nu_1$ through $\nu_4$ respectively represent Abbe's numbers of respective lenses, and reference symbols $f$, $f_2$ and $f_4$ respectively represent focal lengths of the lens system as a whole, second lens $L_2$ and fourth lens $L_4$.

6. A copying objective lens system comprising seven lenses arranged symmetrically on both sides of a stop positioned at the center of said lens system and arranged from both of the object side and image side in the order of first lenses, second lenses, third lenses and a fourth lens, said first lenses being positive meniscus lenses, said second lenses being negative meniscus lenses, said third lenses being positive meniscus lenses, said fourth lens being a biconvex lens having weak refractive power, said first lenses being respectively cemented to said second lenses to form cemented doublet lenses respectively, and said copying objective lens system having the following numerical values:

| | | |
|---|---|---|
| $f = 100$ | $2\omega = 38°$ | F/4.5 |
| $r_1 = 30.062$ | | |
| $d_1 = 7.17$ | $n_1 = 1.816$ | $\nu_1 = 46.84$ |
| $r_{2,3} = 61.620$ | | |
| $d_{2,3} = 4.1$ | $n_2 = 1.6727$ | $\nu_2 = 32.1$ |
| $r_4 = 21.731$ | | |
| $d_4 = 2.22$ | | |
| $r_5 = 32.979$ | | |
| $d_5 = 2.91$ | $n_3 = 1.7432$ | $\nu_3 = 49.37$ |
| $r_6 = 48.451$ | | |
| $d_6 = 3.0$ | | |
| $r_7 = 659.947$ | | |
| $d_7 = 3.12$ | $n_4 = 1.5311$ | $\nu_4 = 62.44$ |
| $r_7 = -659.947$ | | |
| $d_6 = 3.0$ | | |
| $r_6 = -48.451$ | | |
| $d_5 = 2.91$ | $n_3 = 1.7432$ | $\nu_3 = 49.37$ |
| $r_5 = -32.979$ | | |
| $d_4 = 2.22$ | | |
| $r_4 = -21.731$ | | |
| $d_{2,3} = 4.1$ | $n_2 = 1.6727$ | $\nu_2 = 32.1$ |
| $r_{2,3} = -61.620$ | | |
| $d_1 = 7.17$ | $n_1 = 1.816$ | $\nu_1 = 46.84$ |
| $r_1 = -30.062$ | | |
| $f_2 = -52.0$ | | $f_4 = 621.6$ | wherein reference symbols $r_1$ through $r_7$ respectively represent radii of curvature of respective lens surface, reference symbols $d_1$ through $d_7$ respectively represent thicknesses of respective lenses and airspaces between respective lenses, $n_1$ through $n_4$ respectively represent refractive indexes of respective lenses, and reference symbols $\nu_1$ through $\nu_4$ respectively represent Abbe's numbers of respective lenses, and reference symbols $f$, $f_2$ and $f_4$ respectively represent focal lengths of the lens system as a whole, second lens $L_2$ and fourth lens $L_4$.

7. A copying objective lens system comprising seven lenses arranged symmetrically on both sides of a stop positioned at the center of said lens system and arranged from both of the object side and image side in the order of first lenses, second lenses, third lenses and a fourth lens, said first lenses being positive meniscus lenses, said second lenses being negative meniscus lenses, said third lenses being positive meniscus lenses, said fourth lens being a biconvex lens having weak refractive power, and said copying objective lens system having the following numerical values:

| | | |
|---|---|---|
| $f = 100$ | $2\omega = 38°$ | F/4.5 |
| $r_1 = 28.731$ | | |
| $d_1 = 5.371$ | $n_1 = 1.7859$ | $\nu_1 = 44.1$ |
| $r_2 = 303.406$ | | |
| $d_2 = 2.304$ | | |
| $r_3 = 169.579$ | | |
| $d_3 = 1.550$ | $n_2 = 1.6727$ | $\nu_2 = 32.1$ |
| $r_4 = 21.949$ | | |
| $d_4 = 2.522$ | | |
| $r_5 = 34.536$ | | |
| $d_5 = 2.974$ | $n_3 = 1.72$ | $\nu_3 = 42.08$ |
| $r_6 = 48.758$ | | |
| $d_6 = 3.029$ | | |
| $r_7 = 290.474$ | | |
| $d_7 = 1.592$ | $n_4 = 1.53172$ | $\nu_4 = 48.9$ |
| $r_7 = -290.474$ | | |
| $d_6 = 3.029$ | | |
| $r_6 = -48.758$ | | |
| $d_5 = 2.974$ | $n_3 = 1.72$ | $\nu_3 = 42.08$ |
| $r_5 = -34.536$ | | |
| $d_4 = 2.522$ | | |
| $r_4 = -21.949$ | | |
| $d_3 = 1.550$ | $n_2 = 1.6727$ | $\nu_2 = 32.1$ |
| $r_3 = -169.579$ | | |
| $d_2 = 2.304$ | | |
| $r_2 = -303.406$ | | |
| $d_1 = 5.371$ | $n_1 = 1.7859$ | $\nu_1 = 44.1$ |
| $r_1 = -28.731$ | | |
| $f_2 = -37.6$ | $f_4 = 273$ | | wherein reference symbols $r_1$ through $r_7$ respectively represent radii of curvature of respective lens surfaces, reference symbols $d_1$ through $d_7$ respectively represent thicknesses of respective lenses and airspaces between respective lenses, $n_1$ through $n_4$ respectively represent refractive indexes of respective lenses, and reference symbols $\nu_1$ through $\nu_4$ respectively represent Abbe's numbers of respective lenses, and reference symbols $f$, $f_2$ and $f_4$ respectively represent focal lengths of the lens system as a whole, second lens $L_2$ and fourth lens $L_4$.

8. A copying objective lens system comprising seven lenses arranged symmetrically on both sides of a stop positioned at the center of said lens system and arranged from both of the object side and image side in the order of first lenses, second lenses, third lenses and a fourth lens, said first lenses being positive meniscus lenses, said second lenses being negative meniscus lenses, said third lenses being positive meniscus lenses, said fourth lens being a biconvex lens having weak refractive power, and said copying objective lens system having the following numerical values:

| | | |
|---|---|---|
| $f = 242.513$ | $2\omega = 38°$ | F/4.5 |
| $r_1 = 25.847$ | | |
| $d_1 = 5.286$ | $n_1 = 1.7859$ | $\nu_1 = 44.1$ |
| $r_2 = 206.592$ | | |
| $d_2 = 2.267$ | | |
| $r_3 = 331.879$ | | |
| $d_3 = 1.525$ | $n_2 = 1.7495$ | $\nu_2 = 35.19$ |
| $r_4 = 20.172$ | | |
| $d_4 = 2.482$ | | |
| $r_5 = 32.882$ | | |
| $d_5 = 2.927$ | $n_3 = 1.72$ | $\nu_3 = 50.25$ |
| $r_6 = 51.535$ | | |
| $d_6 = 2.981$ | | |
| $r_7 = 331.8795$ | | |
| $d_7 = 1.566$ | $n_4 = 1.53172$ | $\nu_4 = 48.9$ |
| $r_7 = -331.8795$ | | |
| $d_6 = 2.981$ | | |
| $r_6 = -51.535$ | | |
| $d_5 = 2.927$ | $n_3 = 1.72$ | $\nu_3 = 50.25$ |
| $r_5 = -32.882$ | | |
| $d_4 = 2.482$ | | |
| $r_4 = -20.172$ | | |
| $d_3 = 1.525$ | $n_2 = 1.7495$ | $\nu_2 = 35.19$ |
| $r_3 = -346.766$ | | |
| $d_2 = 2.267$ | | |
| $r_2 = -206.592$ | | |
| $d_1 = 5.286$ | $n_1 = 1.7859$ | $\nu_1 = 44.1$ |
| $r_1 = -25.847$ | | |
| $f_2 = -28.7$ | $f_4 = 312.5$ | | wherein reference symbols $r_1$ through $r_7$ respectively represent radii of curvature of respective lens surfaces, reference symbols $d_1$ through $d_7$ respectively represent thicknesses of respective lenses and airspaces between respective lenses, $n_1$ through $n_4$ respectively represent refractive indexes of respective lenses, and reference symbols $\nu_1$ through $\nu_4$ respectively represent Abbe's numbers of respective lenses, and reference symbols $f$, $f_2$ and $f_4$ respectively represent focal lengths of the lens system as a whole, second lens $L_2$ and fourth lens $L_4$.

* * * * *